(12) United States Patent
Krätzig

(10) Patent No.: US 8,813,369 B2
(45) Date of Patent: Aug. 26, 2014

(54) HAND-HELD HEDGE SHEARS

(75) Inventor: David Krätzig, Kornwestheim (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 249 days.

(21) Appl. No.: 13/325,297

(22) Filed: Dec. 14, 2011

(65) Prior Publication Data

US 2012/0151779 A1    Jun. 21, 2012

(30) Foreign Application Priority Data

Dec. 15, 2010    (DE) .......................... 10 2010 054 653

(51) Int. Cl.
*B26B 19/02*    (2006.01)

(52) U.S. Cl.
USPC .................. 30/210; 30/211; 30/518; 30/381

(58) Field of Classification Search
USPC ............ 30/216, 211, 210, 519, 518, 381–387
See application file for complete search history.

(56) References Cited

U.S. PATENT DOCUMENTS

| | | | | |
|---|---|---|---|---|
| 5,065,476 | A * | 11/1991 | Dohse et al. | 16/426 |
| 6,973,726 | B2 * | 12/2005 | Kramer | 30/216 |
| 7,159,322 | B2 * | 1/2007 | Sasaki et al. | 30/216 |
| 7,287,331 | B2 * | 10/2007 | Sasaki et al. | 30/519 |
| 7,407,018 | B2 * | 8/2008 | Sasaki | 173/170 |
| 7,866,048 | B2 * | 1/2011 | Kodama et al. | 30/216 |
| 2012/0073144 | A1 * | 3/2012 | Tamura et al. | 30/272.1 |
| 2013/0097876 | A1 * | 4/2013 | Fong et al. | 30/277.4 |
| 2013/0160304 | A1 * | 6/2013 | Tate | 30/381 |

* cited by examiner

*Primary Examiner* — Omar Flores Sanchez
(74) *Attorney, Agent, or Firm* — Paul D. Strain, Esq.; Strain & Strain PLLC

(57) ABSTRACT

The invention relates to hand-held hedge shears with an in particular electric driving motor. The hedge shears comprises a gripping housing with a rear handle, wherein a gripping part of the rear handle is rotatable about the longitudinal axis thereof and is lockable in the rotational position thereof by means of a locking element. An operating switch lever for the driving motor is arranged on the rotatable gripping part, wherein the operating switch lever acts by means of a sliding element and a transmission element on a switch unit for the rotational speed position of the driving motor. The sliding element is guided on the locking element in a manner sliding in the direction of the longitudinal axis.

14 Claims, 5 Drawing Sheets

HAND-HELD HEDGE SHEARS

CROSS-REFERENCE TO RELATED PATENT APPLICATIONS

This application is based upon and claims the benefit of priority from prior German Patent Application No. 10 2010 054 653.4, filed Dec. 15, 2010 the entire contents of which are incorporated herein by reference in their entirety.

BACKGROUND

The invention relates to hand-held hedge shears with a driving motor, comprising a gripping housing with a rear handle, wherein a gripping part of the rear handle is rotatable about the longitudinal axis thereof and is lockable in the rotational position thereof by means of a locking element, wherein an operating switch lever for the driving motor is arranged on the rotatable gripping part, and wherein the operating switch lever acts by means of a sliding element and a transmission element on a switch unit for the rotational speed position of the driving motor, wherein the sliding element is guided on the locking element in a manner sliding in the direction of the longitudinal axis.

For safety reasons, hand-held hedge shears are used two-handedly. For this purpose, a rear handle with an operating switch lever for the driving motor and a front handle with a safety switch lever for the two-handed operation are provided. In the case of an electric driving motor, the latter can only be put into operation if at the same time one hand is used to actuate the safety switch lever of the front handle and the other hand is used to actuate the operating switch lever of the rear handle.

For certain applications, a fixedly predetermined arrangement of both handles and of the associated switch levers is inexpedient, since, for example when working overhead, the hedge shears has to be held in an unergonomic position for actuation of the operating switch lever, on the one hand, and of the safety switch lever, on the other hand. In order, under this aspect, to expand the range of use of the hedge shears, embodiments are known, in which a gripping part of the rear handle is mounted rotatably about the longitudinal axis thereof in relation to the gripping housing and is lockable in the rotational position thereof by means of a locking element. By unlocking the locking element, the user can bring the gripping part, including the operating switch lever attached thereto, into the desired rotational position and can lock the gripping part there, which results in improved ergonomics for the guiding of the hedge shears for the particular use situation.

In a previously known constructional form, a continuous bearing tube, which is connected fixedly to the gripping housing and on which the gripping part together with the operating switch lever is rotatably mounted, is provided. By means of the bearing tube, which is connected at both ends thereof to the gripping housing, a stiff and portable construction is obtained. However, the bearing tube requires considerable construction space. Since, in addition, to enable a good grip, the cross section of the rotatable gripping part may not be configured to be of unlimited size, there is only little space between the bearing tube and the rotatable gripping part for additional structural elements to be arranged in the gripping part.

The abovementioned construction space situation is further intensified by certain hedge shears being equipped with a "gripping extension". In this case, an additional safety switch lever is arranged at the rear end of the gripping housing, and, for two-handed operation, can be used as an alternative to the safety switch lever of the front handle. This is expedient in particular when working overhead. The transmission element of the additional, rear safety switch lever has to be guided through the rotatable gripping part. The same also applies to a mains cable which may be present. In the above-described constructional form, the mains cable and also the abovementioned transmission element of the rear safety switch lever are guided through the bearing tube.

In addition, an operative connection also is to be produced between the operating switch lever and a switch unit. The switch unit serves to realize a certain switch logic which allows the electric driving motor to be started only if, in addition to the operating switch lever, one of the two safety switch levers is also actuated. The same expediently also applies in the case of an internal combustion engine as the driving motor. According to the prior art, for the operative connection between the operating switch lever and the switch unit, a sliding element is provided, the sliding element being mounted on the bearing tube in a manner sliding in the direction of the longitudinal axis and being displaced linearly by the operating switch lever being pressed in. The linear displacement movement of the sliding element is transmitted to the switch unit via a suitable transmission element.

It follows from the above considerations that, in the previously known embodiment, the construction space is very confined and leaves virtually no more room for additional components. In particular, a blocking lever for blocking the operating switch lever cannot be arranged on the rotatable gripping part, since a blocking lever of this type would collide with the central bearing tube.

SUMMARY OF THE INVENTION

One object of the invention includes developing hedge shears of the type discussed above in such a manner that, with a simple structural design, additional construction space is provided, in particular for additional components.

This and other objects of the invention are achieved by hand-held hedge shears with a driving motor, comprising a gripping housing with a rear handle, wherein a gripping part of the rear handle is rotatable about the longitudinal axis thereof and is lockable in the rotational position thereof by means of a locking element, wherein an operating switch lever for the driving motor is arranged on the rotatable gripping part, and wherein the operating switch lever acts by means of a sliding element and a transmission element on a switch unit for the rotational speed position of the driving motor, wherein the sliding element is guided on the locking element in a manner sliding in the direction of the longitudinal axis.

Further objects, features and advantages of the present invention will become apparent from the detailed description of preferred embodiments of the invention which is set forth below, when considered together with the figures of drawing.

BRIEF DESCRIPTION OF THE DRAWINGS

An exemplary embodiment of the invention is described in more detail below with reference to the drawing, in which:

FIG. 5 shows the arrangement according to FIG. 4 with the blocking lever pressed in and with the operating switch lever pressed in;

DETAILED DESCRIPTION OF PREFERRED EMBODIMENTS

Figure 1:
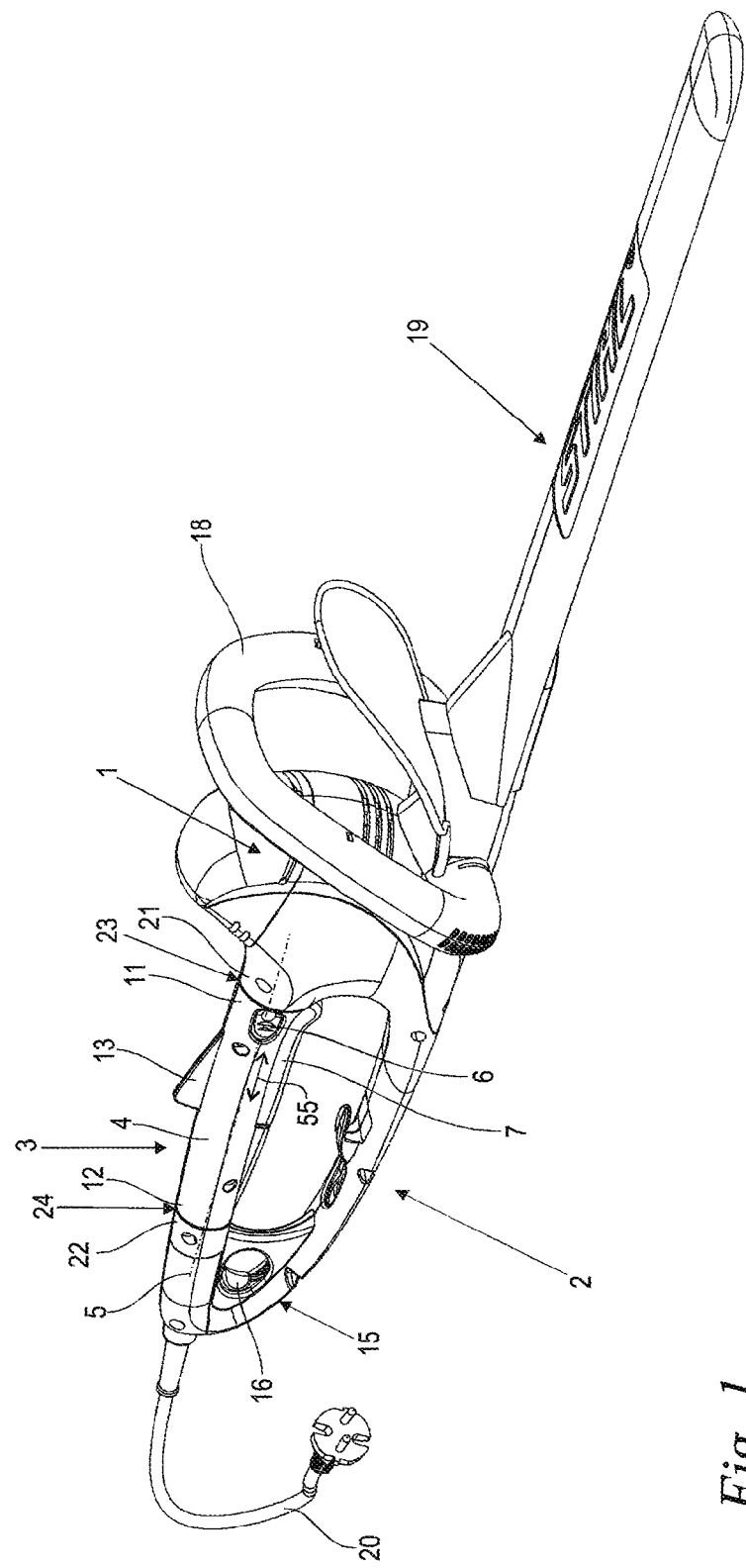
FIG. 1 shows hedge shears designed according to the invention in a perspective overview illustration.

According to the invention, it is provided that the sliding element which is responsible for converting the actuation of the operating switch lever into a linear actuating movement for the switch unit is not, as is customary in the prior art, guided on a bearing tube but rather is guided directly on the locking element of the rotatable gripping part in a manner sliding in the direction of the longitudinal axis. The direct sliding guidance of the sliding element on the locking element makes it possible to do without the bearing function of the previously known bearing tube for this purpose. In a preferred development, the bearing tube as a whole can be omitted, wherein, then, the rotatable gripping part is mounted rotatably at the front end thereof and at the rear end thereof directly on the gripping housing. By omitting the bearing tube according to the prior art, considerable additional construction space is provided. In a preferred development, this permits the arrangement of a blocking lever, which acts on the operating switch lever, on the rotatable gripping part, in particular on the side thereof opposite the operating switch lever, thus providing an additional safety aspect. Furthermore, it is readily possible for an additional, second safety switch lever for the two-handed operation of the hedge shears to be arranged at the rear end of the gripping housing in the manner of a gripping extension, with an associated transmission element, in particular in the form of a Bowden cable, being guided through the rotatable gripping part. All of the components can easily be arranged in the rotatable gripping part or can be guided through the latter. Nevertheless, the rotatable gripping part may be of slim design to enable a good grip.

In a preferred embodiment, the sliding element is guided so as to be non-rotatable, but linearly displaceable in the locking element and is rotatable together with the locking element and the rotatable handle, with the transmission element, which is formed in particular from a wire, being mounted rotatably on the sliding element. The configuration of the sliding element so as to be rotatable together with the locking element permits neat and tilt-free linear guidance. By means of the rotatable mounting of the transmission element on the sliding element, the transmission element is reliably prevented from rotating at the same time. The rotatable gripping part can be brought into any angle of rotation position without being obstructed here by the transmission element. The configuration of the transmission element as a wire confers a certain degree of rigidity thereon in the bending and also in the torsion direction. Additional guides may be omitted. Similarly, unintentional torsion of the transmission element during a rotational movement of the gripping part is reliably prevented. In addition, it is expedient that the transmission element acts on the sliding element at least approximately in the longitudinal axis of the gripping part and is mounted there.

This prevents there being interaction between the rotational movement of the gripping part and the regulating position of the transmission element. On the contrary, the rotational movement and regulating position are reliably decoupled from each other.

In an expedient development, the locking element for the rotatable gripping part is designed as a locking slide which is actuable in the direction of the longitudinal axis. By means of the linear actuating direction of the latter, which direction is axially parallel to the longitudinal axis of the rotatable gripping part, an interaction of the displacement movement of the locking slide on the regulating position of the transmission element assigned to the operating switch lever is likewise avoided or prevented and decoupling of the displacement movement and regulating position is ensured.

The gripping part is mounted rotatably on the gripping housing expediently between the front end and the rear end of the gripping part and associated free ends of the gripping housing by means of encircling grooves and springs. This forms a precise and space-saving rotational mounting which acts exclusively in the circumferential region of the rotatable gripping part and does not require any construction space radially inwards. The internal constructional volume of the rotatable gripping part is unrestrictedly available for the arrangement or passing-through of various components.

The operating switch lever is advantageously designed as a pivot lever, which is mounted pivotably on the rotatable gripping part, and acts on the sliding element by means of an articulated arm. The pivotable mounting permits a sensitive, jamming-free actuation while the articulated arm ensures exact conversion of the pivoting movement into a linear sliding movement of the sliding element. The blocking lever is expediently designed as a pivot lever, which is mounted pivotably on the rotatable gripping part, and acts on the operating switch lever by means of a blocking arm protruding transversely through the rotatable gripping part. A kinematically and structurally simple arrangement having great operating reliability is provided.

The driving motor may be an internal combustion engine and is in particular an electric driving motor. The advantages of the invention particularly have an effect here, since, for the electric current supply and control, a multiplicity of cables and transmission elements have to be guided through the rotatable gripping part. The configuration according to the invention provides sufficient construction space for this purpose without the rotatable gripping part having to be provided with an excessively large cross section.

Turning now to the figures, FIG. 1 shows, in a perspective illustration, hedge shears designed according to the invention with a driving motor 1 (not illustrated specifically) which here is electric. A mains cable 20 is provided in order to supply the electric driving motor 1 with electric power or mains voltage. However, a battery may also be provided in or on the hedge shears in order to supply the electric driving motor 1, the mains cable 20 then being omitted. The driving motor 1 may also be an in particular single-cylinder two-stroke or four-stroke internal combustion engine.

According to the customary constructional form, the hedge shears has a set of cutters 19 which, in the graphical illustration, is covered by a guard. The set of cutters 19 is adjoined by a housing for receiving the driving motor 1 and by a gripping housing 2 to the rear thereof. A bow-shaped front handle 18 is arranged between the gripping housing 2 and the set of cutters 19. Furthermore, the gripping housing 2 also has a rear handle 3. The rear handle 3 comprises a gripping part 4 which is mounted rotatably about a longitudinal axis 5 in relation to the stationary gripping housing 2, which is formed integrally with the motor housing. The longitudinal axis 5 preferably lies at least approximately parallel to the longitudinal axis of the entire hedge shears or to the set of cutters 19 thereof.

The gripping housing 2 is designed in the form of an open ring and has two mutually facing free ends 21, 22. The rotatable gripping part 4 is located therebetween, wherein the front end 11 thereof borders the front, free end 21 of the gripping housing 2, with a front separating gap 23 being formed, and the rear end 12 thereof borders the rear, free end 22 of the gripping housing 2, with a rear separating gap 24 being formed. In the region of the two separating gaps 23, 24, the gripping part 4 is mounted by means of the two ends 11, 12 thereof directly on the free ends 21, 22 of the gripping housing 2 so as to be rotatable about the longitudinal axis 5 in a manner described in more detail further below and with a bearing tube which is customary according to the prior art being omitted.

An operating switch lever 7 for the rotational speed position of the driving motor 1 is arranged on the rotatable gripping part 4. The rotational speed position here means generally that, alternatively, either a simple switching on/off is realized, or that, according to the preferred exemplary embodiment shown, a rotational speed control or power control between shutdown of the motor (the electric driving motor is switched off) and full load (the electric driving motor receives full electric voltage) with any intermediate steps, for example by means of a potentiometer control, can be provided. Within the scope of the abovementioned rotational speed position, rotational speed regulation is also possible, wherein the rotational speed of the driving motor 1 is predetermined or set between zero and the maximum or operating rotational speed by means of the operating switch lever 7. The same expediently also applies when the driving motor 1 is configured as an internal combustion engine. In this case, the operating switch lever 7 then acts on the carburetor or on the throttle valve thereof or on an electric or electronic control of the internal combustion engine.

In addition, a blocking lever 13 acting on the operating switch lever 7 is arranged on the rotatable gripping part 4 on the side opposite the operating switch lever 7, with respect to the longitudinal axis 5. The blocking lever 13 is designed in such a manner that the operating switch lever 7 can be pressed in only when the blocking lever 13 is pressed in and, as a result, the electric driving motor 1 can be switched on. In addition, a locking element 6 is arranged on the rotatable handle 4, by means of which locking element the rotatable gripping part 4 can be locked in the selected rotational position relative to the gripping housing 2. After the locking element 6 is released, the gripping part 4 can be rotated about the longitudinal axis 5 thereof, wherein the locking element 6, the operating switch lever 7 and the blocking lever 13 are also rotated together with the gripping part 4. In the locked state of the gripping part 4 and of the locking element 6, the blocking lever 13 and the operating switch lever 7 are actuable whereas they are blocked or stopped from functioning in the unlocked state.

The locking element 6 may be a rotary knob, a pivot lever or the like and, in the exemplary embodiment illustrated, is designed as a locking slide which is actuable and is linearly displaceable preferably at least approximately in the direction of the longitudinal axis 5 or axially parallel thereto, corresponding to a double arrow 55. Details in this regard are described in more detail further below.

Figure 3:
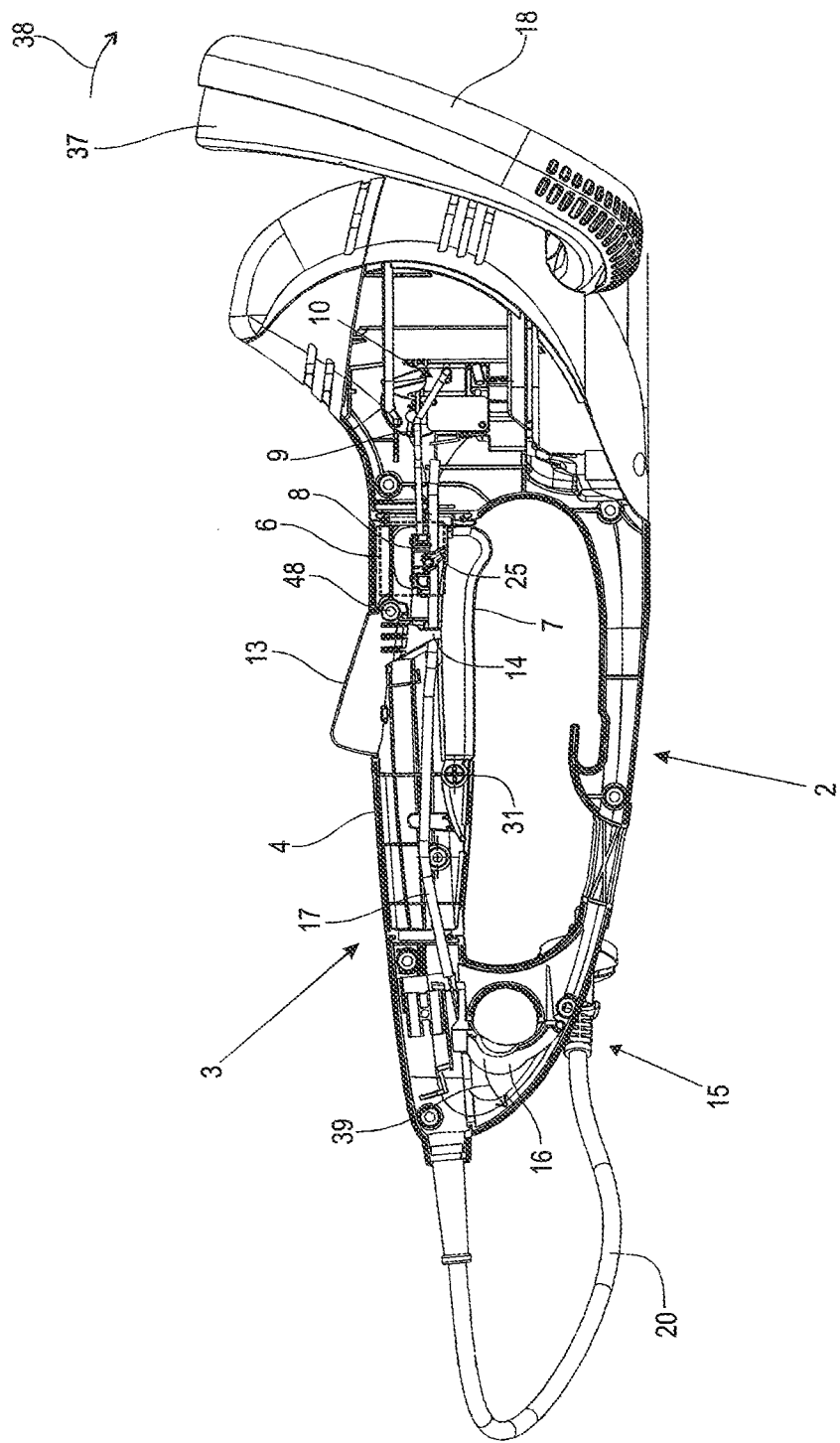
FIG. 3 shows a longitudinal sectional illustration of the arrangement according to FIG. 2 in the fitted state.

The hedge shears shown is designed for two-handed operation in such a manner that it can only be put into operation if grasped and guided simultaneously by both the user's hands. For this purpose, the gripping part 4 is grasped with one hand and, in the process, both the blocking lever 13 and the operating switch lever 7 are actuated. With the other hand, the user grips the front handle 18 and, in the process, actuates a safety switch lever 37 which is illustrated in FIG. 3 and, when gripped around in accordance with the illustration according to FIG. 3, is pressed in the direction of an arrow 38 towards the front handle 18.

In addition to the front handle 18, a "gripping extension" with a further safety switch lever 16 is optionally arranged at a rear end 15 of the gripping housing 2. Instead of grasping the front handle 18, the user, with his second hand, can grasp the gripping housing 2 in the region of the rear end 15 thereof and, in the process, can actuate the rear safety switch lever 16 as an alternative to the front safety switch lever 37 (FIG. 3).

Figure 2:
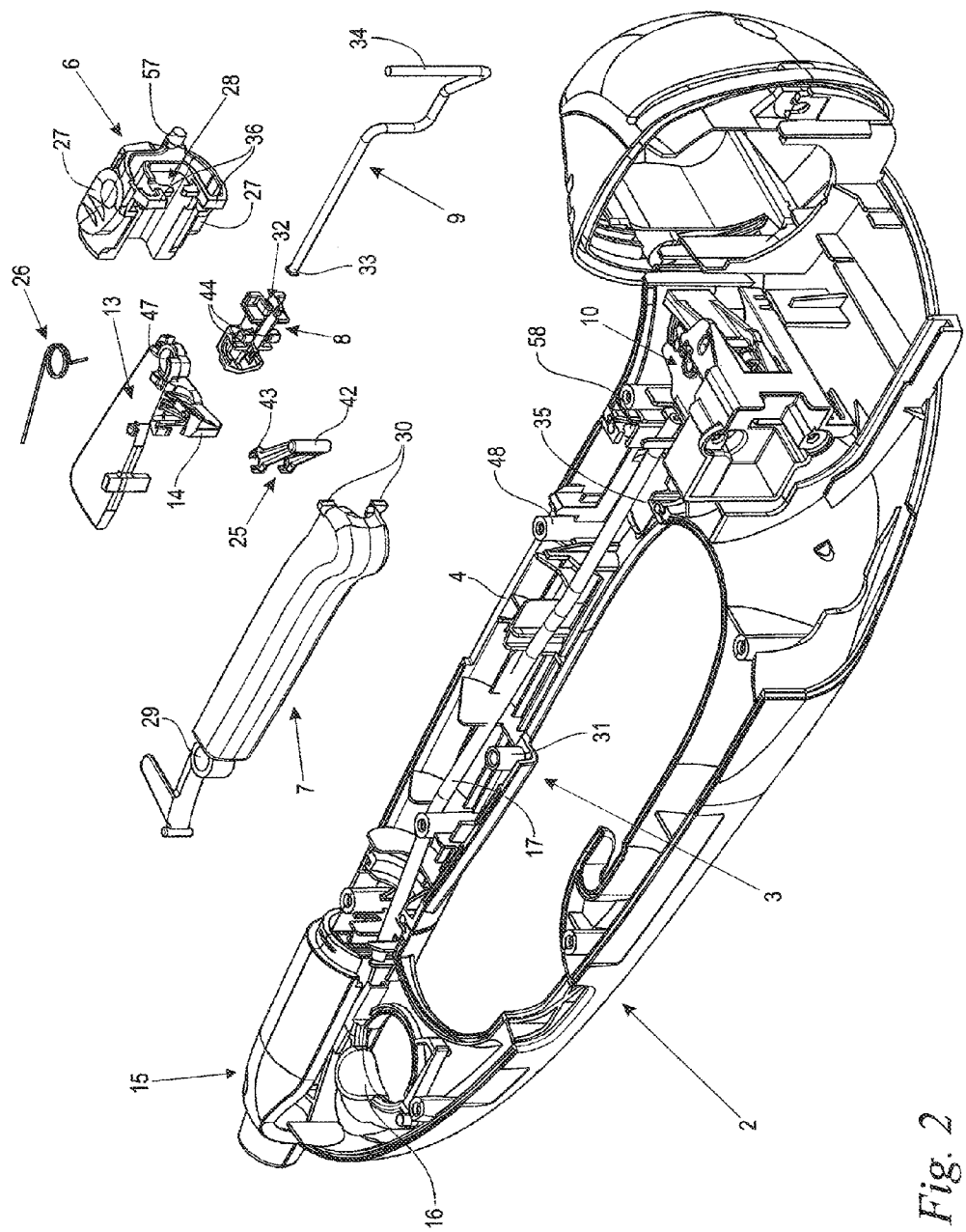
FIG. 2 shows an exploded illustration of the gripping housing of the hedge shears according to FIG. 1 with details of the gripping housing components used.

FIG. 2 shows the hedge shears according to FIG. 1 in an exploded illustration in the region of the gripping housing 2. Like the gripping part 4 which is rotatable relative thereto, the gripping housing 2 is constructed in the form of half shells from injection-molded plastic, wherein only one half shell in each case is illustrated here for the sake of better clarity. A switch unit 10 is arranged in the gripping housing 2 and ensures, via corresponding switch logic, that the electric driving motor 1 (FIG. 1) starts only if either the front safety switch lever 37 (FIG. 3) or the rear safety switch lever 16 is also actuated at the same time as the operating switch lever 7. Accordingly, an operative connection of the operating switch lever 7, of the rear safety switch lever 16 and of the front safety switch lever (FIG. 3) to the switch unit 10 is provided. Specifically, for this purpose, a transmission element 17 is arranged from the rear safety switch lever 16 to the switch unit 10, the transmission element, in the exemplary embodiment shown, being designed as a Bowden cable and being guided from the rear safety switch lever 16 to the switch unit 10 through the rotatable gripping part 4. If an electric switch which is actuated by the rear safety switch lever 16 is arranged in the region of the latter, the transmission element 17 may also be designed as an electric cable which is guided in the same manner through the gripping part 4. A transmission element which is actually present from the front safety switch lever 37 (FIG. 3) to the switch unit 10 is not illustrated for the sake of better clarity.

An articulated arm 25, a sliding element 8 and a transmission element 9 are provided for the operative connection between the operating switch lever 7 and the switch unit 10, wherein, in the exemplary embodiment shown, the transmission element 9 is designed as a multiply bent wire, but may also be a Bowden cable or the like. The transmission element 9 has a bent, free end 34, by means of which the transmission element, in the fitted state, is hooked into the switch unit 10. Opposite thereto, the transmission element 9 is provided with a thickened, compressed end 33, by means of which it is fitted into a receptacle 32 of the sliding element 8.

The articulated arm 25 is formed by a pivot 42 with two arms integrally formed thereon, wherein a fork 43 is formed in each case at those ends of the two arms which are opposite the pivot 42. Corresponding thereto, the sliding element 8 has two retaining pins 44 onto which the two forks 43 of the articulated arm 25 are snapped in the fitted state. In the fitted state, the pivot 42 of the articulated arm 25 is mounted pivotably in the interior of the operating switch lever 7.

The locking element 6 designed as a locking slide has two laterally opposite actuating projections 27. Corresponding thereto, openings 35 are provided in side surfaces of the gripping housing 2, through which openings the actuating projections 27 protrude outwards in the fitted state while the basic body of the locking element 6 is mounted in a sliding manner in the interior of the gripping housing 2. According to the illustration according to FIG. 1, the two outwardly protruding actuating projections 27 can be grasped by the user and a linear actuation of the locking element 6 thus brought about.

A latching lug 57 is integrally formed on the locking element 6, on the front side thereof facing the electric driving motor 1 (FIG. 1), while, corresponding thereto, a number of latching openings 58 is provided in the gripping housing 2. In the locked state of the rotatable gripping part 4, the latching lug 57 engages in one of the latching openings 58, as a result of which the rotational position of the gripping part 4 is defined relative to the gripping housing 2. In the pulled-back state of the locking element 6, the latching lug 57 is pulled out of the latching openings 58 such that the gripping part 4 can be rotated freely relative to the gripping housing 2 about the longitudinal axis 5 (FIG. 1).

In addition, the locking element 6 has two blocking surfaces 36, with two blocking surfaces 30 being integrally formed corresponding thereto on the operating switch lever 7. By this means, blocking of the operating switch lever 7 can be brought about in the manner described further below. A sliding receptacle 28 is also formed centrally in the locking element 6, the sliding element 8 coming to lie in the sliding receptacle in the fitted state, wherein the sliding element 8 can then be displaced in the sliding receptacle 28 relative to the locking element 6 in the direction of the longitudinal axis 5 with the effect of a sliding bearing.

The operating switch lever 7 can be a sliding switch or the like and, in the exemplary embodiment shown, is designed as a pivot lever. For this purpose, the operating switch lever 7 is provided with a bearing eye 29 while journals 31 are formed in the interior of the hollow gripping part 4, the journals, in the fitted state, engaging in the bearing eye 29 of the operating switch lever 7.

The same expediently also applies to the blocking lever 13. The latter may also be a sliding switch or the like and, in the exemplary embodiment shown, is designed as a pivotably mounted pivot lever. For this purpose, a bearing eye 47 is formed in the blocking lever 13, to which end journals 48 formed integrally therewith are correspondingly provided in the interior of the gripping part 4. In the fitted state, the journals 48 reach through the bearing eye 47 of the blocking lever 13 and thereby permit a pivoting movement of the blocking lever 13 relative to the gripping part 4. For a pre-stressed return position of the blocking lever 13, a leg spring 26 is provided, the function of which is described in more detail further below in conjunction with FIGS. 6 and 7. In addition, a blocking arm 14 is integrally formed on the blocking lever 13, the function of which blocking arm is described in more detail further below in conjunction with FIGS. 4 and 5.

FIG. 3 shows the fitted arrangement according to FIG. 2 in a longitudinal sectional illustration. It can be seen that the transmission element 17 in the form of the Bowden cable, with a sheath fixed in the axial direction and a core which is moveable axially therein and leads from the safety switch lever 16, which is arranged at the rear end 15 of the gripping housing 2, to the switch unit 10, is guided through the rear handle 3 and in particular through the gripping part 4, which is rotatable relative to the gripping housing 2, without being fixedly connected to the gripping part 4. This can mean that there is no rotational connection between the sheath of the Bowden cable and the gripping part 4, the gripping part 4 rotating about the sheath of the Bowden cable. However, the sheath of the Bowden cable may also be connected to the gripping part 4 for conjugate rotation and therefore they together form a constructional unit which rotates about the core of the Bowden cable. Since, however, the transmission element 17 is preferably at least approximately coaxial to the longitudinal axis 5 (FIG. 1) and to the axis of rotation of the gripping part 4, and since, in addition, the transmission element 17 has a compensating flexibility, the rotational movement of the gripping part 4 is never obstructed by the transmission element 17. Conversely, the rotational position of the gripping part 4 also does not have any effect on the transmission element 17 or the switching position thereof. The same expediently also applies to the mains cable 20, that section of the mains cable 20 which is guided from the rear end 15 through the gripping part 4 to the switch unit 10 not being illustrated for the sake of better clarity.

The operating switch lever 7 is mounted with the bearing eye thereof (FIG. 2) on the journal 31 while the radially opposite blocking lever 13 is mounted with the bearing eye 47 thereof (FIG. 2) on the journal 48. The blocking arm 14 of the blocking lever 13 protrudes from the blocking lever 13 transversely through the interior of the rotatable gripping part 4 and engages in the U-shaped cross section of the operating switch lever 7.

For the sake of better clarity, the locking element 6 according to FIG. 2 is only illustrated schematically here in FIG. 3 as a block element in the form of a rectangle shown by dashed lines. The sliding element 8 is mounted in a sliding manner in the locking element 6, specifically in the sliding receptacle 28 thereof according to FIG. 2. The transmission element 9, which is fitted in the sliding element 8, engages at the opposite end thereof in the switch unit 10. Finally, the articulated arm 25 is also mounted in the interior of the operating switch lever 7 and is connected to the sliding element 8 in the abovementioned manner. By this means, an operative connection between the operating switch lever 7 and the switch unit 10 is produced via the articulated arm 25, the sliding element 8 and the transmission element 9.

In order to set the electric driving motor 1 to be ready for operation, the user has to use one hand to move either the front safety switch lever 37 in the direction of the arrow 38 or the rear safety switch lever 16 in the direction of an arrow 39. In the latter case, the movement of the rear safety switch lever 16, which movement is pivoting here, in the direction of the arrow 39 is transmitted to the switch unit 10 by means of the transmission element 17. The transmission of the pivoting movement of the operating switch lever 7 to the switch unit is described in more detail below with reference to drawings 4 and 5.

Figure 4:
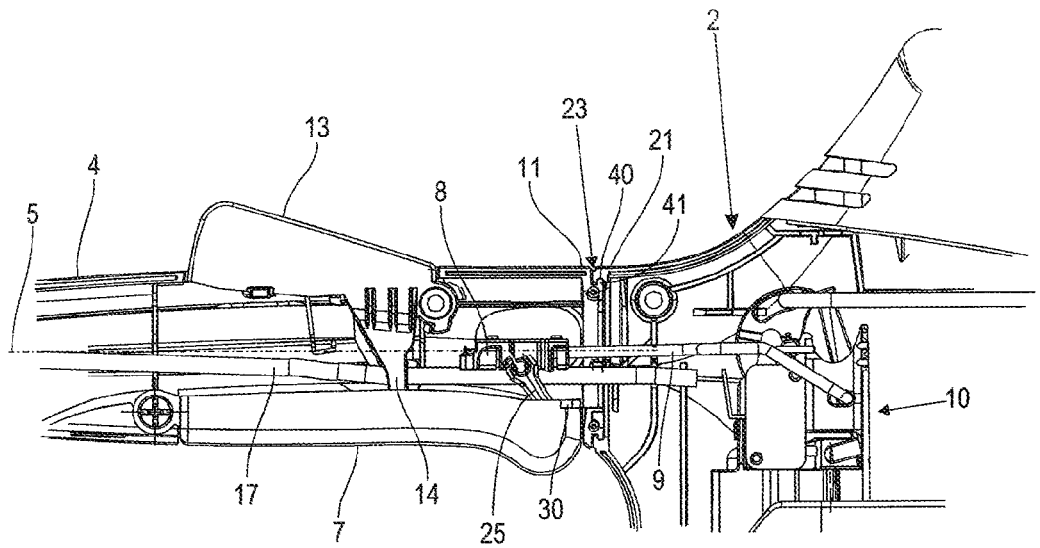
FIG. 4 shows an enlarged detailed illustration of the arrangement according to FIG. 3 in an inoperative position.

FIG. 4 shows an enlarged detailed illustration of the arrangement according to FIG. 3 in the region of the operating switch lever 7 and of the blocking lever 13. The operating switch lever 7 and the blocking lever 13 are shown in the inoperative position and, accordingly, the electric driving motor 1 (FIG. 1) is switched off. In this position, the blocking arm 14 of the blocking lever 13 preferably protrudes approximately perpendicularly to the longitudinal axis 5 through the rotatable gripping part 4 into the U-shaped cross section of the operating switch lever 7 in such a manner that the latter cannot be pressed in.

A kinematically unambiguous connection between the operating switch lever 7 and the sliding element 8 is produced by means of the articulated arm 25, as a result of which the sliding element 8 is in a front inoperative position. The transmission element 9 is also in a front inoperative position, and, accordingly, the switch unit 10 is in the configuration thereof which switches off the electric driving motor 1 (FIG. 1).

Furthermore, the blocking surfaces 30 of the operating switch lever 7 can also be seen. If the locking element 6 (FIGS. 1, 2) is brought into the rear, unlocked position for rotational adjustment of the gripping part 4, the blocking surfaces 36 (FIG. 2) thereof lie right above the blocking surfaces 30 of the operating switch lever 7 such that the latter cannot be actuated. Only when the locking element 6 is brought into the locked front position is there no longer any overlap between the blocking surfaces 30 of the operating switch lever 7 and the blocking surfaces 36 of the locking element 6 (FIG. 2) such that the operating switch lever 7 can be pressed in, corresponding to FIG. 5. This ensures that the hedge shears can only be put into operation in the locked state of the gripping part 4 in relation to the gripping housing 2, but not in the unlocked state.

The enlarged illustration according to FIG. 4 also shows the configuration of the mounting of the gripping part 4 on the gripping housing 2. For this purpose, the rotatable gripping part 4 is provided at the front end 11 thereof with an annularly encircling spring 41 which engages in a likewise annularly encircling groove 40 at the front free end 21 of the fixed gripping housing 2. By this means, an axially form-fitting, fixed connection is produced between the gripping part 4 and the gripping housing 2, the connection, however, permitting a rotational movement of the gripping part 4 about the longitudinal axis 5 thereof relative to the fixed gripping housing 2 by means of a rotating sliding movement of the spring 41 in the groove 40. The connection or mounting between the gripping part 4 and the gripping housing 2 in the region of the rear end 12 of the gripping part 4 and of the rear free end 22 of the gripping housing 2 (FIG. 1) is configured in the same manner. Further bearing elements do not exist between the rotatable gripping part 4 and the gripping housing 2. In particular, a bearing tube, which is customary according to the prior art and is guided through the gripping part 4, is not provided. Nevertheless, within the scope of the invention, instead of the groove and spring system shown here, a different form of mounting, in particular in the form of a sliding bearing, may also be expedient, wherein a direct mounting of the gripping part 4 on the gripping housing 2 in the region of the separating gap 23, 24 (FIG. 1) is to be provided in each case.

It emerges from looking at FIGS. 2 and 4 that, although the transmission element 9, which is fitted by the thickened end 33 thereof into the receptacle 32 of the sliding element 8, produces an axially acting tensile connection between the two components, free relative rotatability of the transmission element 9 with respect to the sliding element 8 is nevertheless permitted. In addition, although the sliding element 8 is mounted in a sliding manner in the direction of the longitudinal axis 5 in the locking element 6, it is mounted so as to be non-rotatable with respect thereto. During a rotational movement of the gripping part 4 about the longitudinal axis 5 thereof, the sliding element 8 also rotates in addition to the locking element 6. However, because of the above-described loose fitting of the transmission element 9 in the sliding element 8, the rotational movement is not transmitted to the transmission element 9. In addition, it can be seen that the transmission element 9, at least in the connecting point thereof to the sliding element 8, lies at least approximately, and preferably precisely, on the longitudinal axis 5. Overall, it is thereby ensured that the rotational movement of the gripping part 4 relative to the gripping housing 2 and the switching position of the transmission element 9 and of the switch unit 10 are independent of each other and are therefore completely decoupled. Since, in addition, the locking element 6 is displaceable axially parallel to the longitudinal axis 5 of the gripping part 4, corresponding to the double arrow 55 in FIG. 1, there is just such a decoupling between the switching position of the locking element 6 and the switching position of the functional unit consisting of the operating switch lever 7, the articulated arm 25, the sliding element 8, the transmission element 9 and the switch unit 10.

Figure 5:
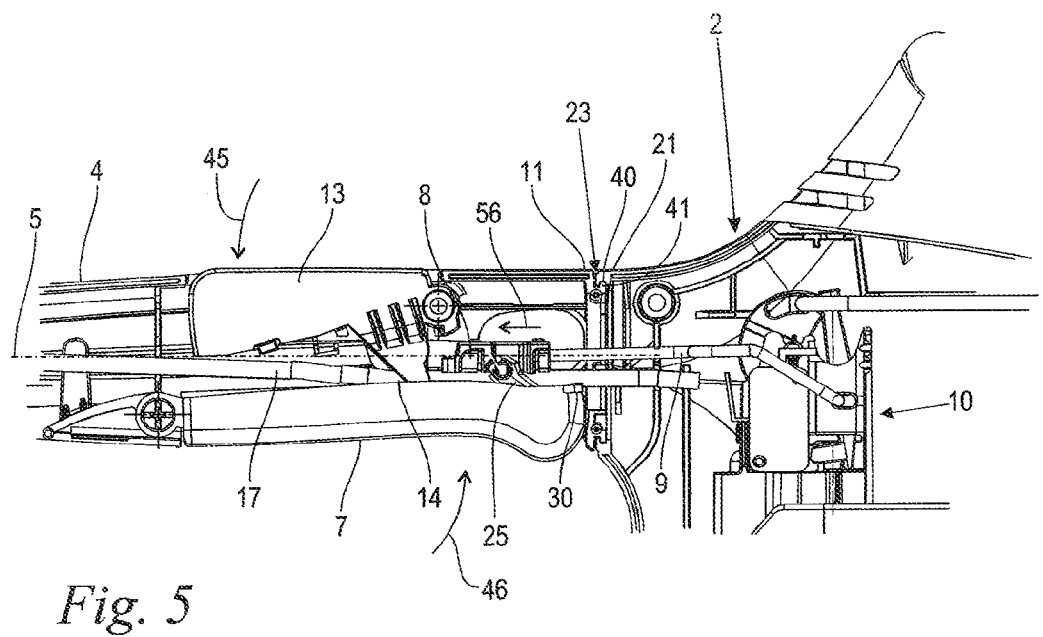

FIG. 5 shows the arrangement according to FIG. 4, in which the operating switch lever 4 and the blocking lever 13 are pressed in to switch on the electric driving motor 1 (FIG. 1). For this purpose, the blocking lever 13 is first of all pressed in corresponding to an arrow 45, as a consequence of which the blocking arm 14 of the blocking lever pivots forwards. By this means, the blocking arm 14 no longer blocks the operating switch lever 7, and therefore the operating switch lever 7 can be pressed in corresponding to an arrow 46. The pivoting movement of the operating switch lever 7 in the direction of the arrow 46 is transmitted to the sliding element 8 by means of the articulated arm 25 in such a manner that the sliding element 8 is displaced in the sliding receptacle 28 of the locking element 6 (FIG. 2) to the rear linearly and axially parallel to the longitudinal axis 5 of the gripping part 4 from the inoperative position according to FIG. 4 in accordance with an arrow 56. This displacement movement of the sliding element 8 is transmitted via edges (not denoted specifically) of the receptacle 32 in the sliding element 8 (FIG. 2) to the thickened end 33 of the transmission element 9 (FIG. 2) such that the transmission element 9 is likewise pulled rearwards in the direction of the arrow 56 and, by this means, corresponding switching information is transmitted to the switch unit 10 by means of the angled free end 34 (FIG. 2). If, then, at the same time either the front safety switch lever 37 or alternatively the rear safety switch lever 16 (FIG. 3) is also pressed in and the corresponding switching information is transmitted to the switch logic of the switch unit 10, the electric driving motor 1 (FIG. 1) starts and sets the set of cutters 19 of the hedge shears (FIG. 1) into operation.

The fitting of the transmission element 9 by the thickened end 33 thereof into the receptacle 32 of the sliding element 8 (FIG. 2) is also configured in such a manner that, although tension is transmitted from the sliding element 8 to the transmission element 9 in the direction of the arrow 56, tension is not transmitted in the opposite direction. In the opposite direction, there is axial play between the sliding element 8 and the transmission element 9 in order to avoid distortions in certain switching states.

Figure 6:
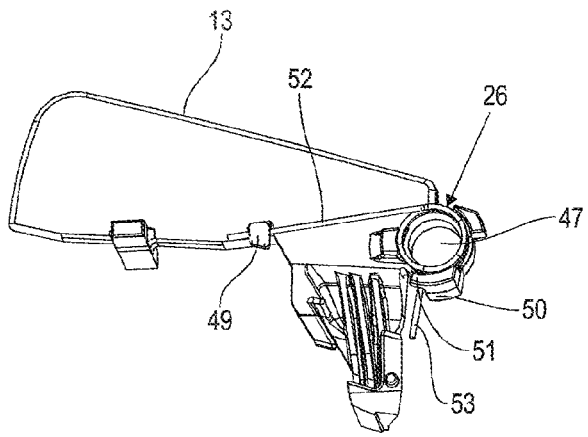
FIG. 6 shows a component part illustration of the blocking lever according to the preceding figure with a leg spring fitted in a prestressed manner.

FIG. 6 shows a perspective component part illustration of the blocking lever 13 and of the leg spring 26 according to FIG. 2 in the fitted state. For this purpose, the blocking lever 13 is provided with a hook 49, a lug 50 and a projection 51 whereas the bearing eye 47 is designed in the form of an integrally formed cylindrical sleeve. The eye of the leg spring 26 is placed around the sleeve of the bearing eye 47, wherein a first leg 52, which is longer here, comes to lie under the hook 49 with prestress. A second leg 53, which is shorter here, of the leg spring 26 bears against the lug 50 likewise under prestress and is secured against slipping by means of the projection 51. This results in the formation of a constructional unit of blocking lever 13 and leg spring 26, which constructional unit can be preassembled with the abovementioned prestress and handled as a separate subassembly.

Figure 7:
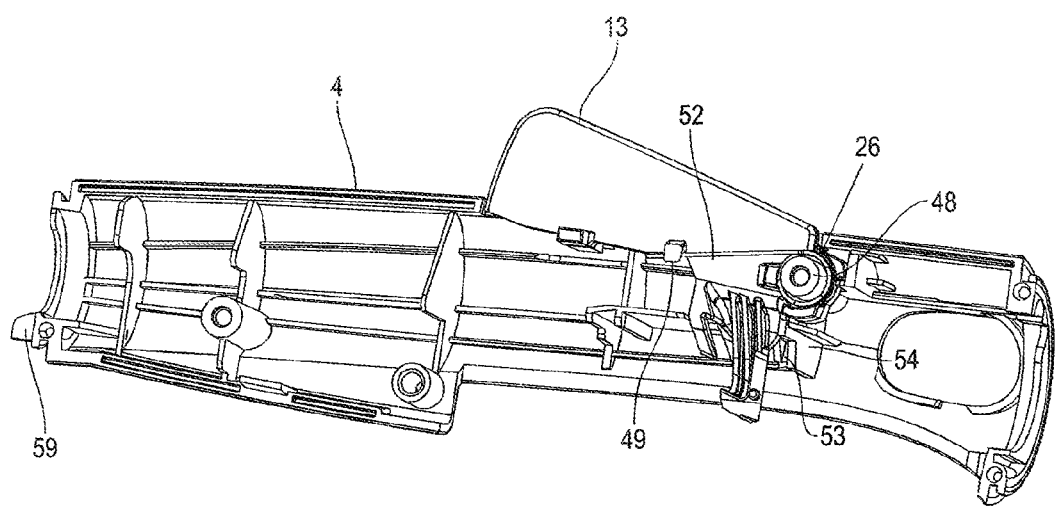
FIG. 7 shows the blocking lever according to FIG. 6 in the installed state with the leg spring fitted in the gripping part.

During the installation corresponding to the illustration according to FIG. 7, the abovementioned subassembly according to FIG. 6 is plugged onto the journal 48 of the gripping part 4. Only then is the second leg 53 of the leg spring 26 raised counter to the prestressing force thereof from the lug 50 (FIG. 6) of the blocking lever 13 and clamped behind a bearing surface 54 of the gripping part 4. It is ensured that the leg spring 26 cannot be lost either during installation or during removal of the blocking lever 13. In the fitted state according to FIG. 7, the blocking lever 13 is pressed into the outer inoperative position thereof according to FIG. 4 under prestress by means of the leg spring 26.

It can also be gathered from the illustration according to FIG. 7 that a securing lug 59 is integrally formed at an end, here the rear end, of the gripping part 4. The securing lug 59 serves as a securing measure against overrotation of the gripping part 4 relative to the gripping housing 2 (FIG. 1). By contact of the securing lug 59 with a stop (not illustrated), the relative rotatability of the gripping part 4 to the gripping housing 2 (FIG. 1) is restricted to a total of <360°.

The foregoing description of preferred embodiments of the invention has been presented for purposes of illustration and description only. It is not intended to be exhaustive or to limit the invention to the precise form disclosed, and modifications and variations are possible and/or would be apparent in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto and that the claims encompass all embodiments of the invention, including the disclosed embodiments and their equivalents.

The invention claimed is:

1. Hand-held hedge shears with a driving motor, comprising a gripping housing with a rear handle, wherein a rotatable gripping part of the rear handle is rotatable about the longitudinal axis thereof and is lockable in a rotational position thereof by engagement of a locking element, wherein an operating switch lever for the driving motor is arranged on the rotatable gripping part, wherein the operating switch lever acts upon a a sliding element, wherein the sliding element acts upon a transmission element, wherein the transmission element acts upon a switch unit that controls the rotational speed of the driving motor, wherein the sliding element translates the actuation of the operating switch lever into a linear actuation motion that ultimately acts upon the switch element, and wherein the sliding element is guided on the locking element such that the sliding element is slidable in the direction of the longitudinal axis.

2. The hedge shears according to claim 1, wherein the sliding element is guided so as to be non-rotatable, but linearly displaceable in the locking element and is rotatable together with the locking element and the rotatable gripping part, with the transmission element being mounted rotatably on the sliding element.

3. The hedge shears according to claim 2, wherein the transmission element is formed from a wire.

4. The hedge shears according to claim 1, wherein the transmission element acts on the sliding element at least approximately in the longitudinal axis of the gripping part.

5. The hedge shears according to claim 1, wherein the locking element is designed as a locking slide which is actuable in the direction of the longitudinal axis.

6. The hedge shears according to claim 1, wherein the rotatable gripping part has a front end and a rear end and, at the front end thereof and at the rear end thereof, is mounted rotatably directly on the gripping housing.

7. The hedge shears according to claim 6, wherein the gripping part is mounted rotatably on the gripping housing between the front end and the rear end and associated free ends of the gripping housing by means of grooves and springs.

8. The hedge shears according to claim 1, wherein a blocking lever acting on the operating switch lever is arranged on the rotatable gripping part.

9. The hedge shears according to claim 8, wherein the blocking lever is arranged on the side opposite the operating switch lever.

10. The hedge shears according to claim 9, wherein the blocking lever is designed as a pivot lever, which is mounted pivotably on the rotatable gripping part, and acts on the operating switch lever by means of a blocking arm protruding transversely through the rotatable gripping part.

11. The hedge shears according to claim 1, wherein a safety switch lever for two-handed operation of the hedge shears is arranged at a rear end of the gripping housing, a transmission element being guided through the rotatable gripping part.

12. The hedge shears according to claim 11, wherein the transmission element is a Bowden cable.

13. The hedge shears according to claim 1, wherein the operating switch lever is designed as a pivot lever, which is mounted pivotably on the rotatable gripping part, and acts on the sliding element by means of an articulated arm.

14. The hedge shears according to claim 1, wherein the driving motor is an electric driving motor.

* * * * *